US006760814B2

(12) United States Patent
Corrigan

(10) Patent No.: US 6,760,814 B2
(45) Date of Patent: Jul. 6, 2004

(54) METHODS AND APPARATUS FOR LOADING CRC VALUES INTO A CRC CACHE IN A STORAGE CONTROLLER

(75) Inventor: Brian E. Corrigan, Wichita, KS (US)

(73) Assignee: LSI Logic Corporation, Milpitas, CA (US)

(*) Notice: Subject to any disclaimer, the term of this patent is extended or adjusted under 35 U.S.C. 154(b) by 219 days.

(21) Appl. No.: 10/076,681

(22) Filed: Feb. 14, 2002

(65) Prior Publication Data

US 2003/0115417 A1 Jun. 19, 2003

Related U.S. Application Data

(63) Continuation-in-part of application No. 10/022,051, filed on Dec. 17, 2001.

(51) Int. Cl.[7] .............................................. G06F 12/00
(52) U.S. Cl. ..................... 711/133; 711/154; 711/214; 711/217; 214/42; 214/52
(58) Field of Search ................................. 711/118, 133, 711/154, 217, 219, 214; 714/42, 52, 54, 722

(56) References Cited

U.S. PATENT DOCUMENTS

| | | | | |
|---|---|---|---|---|
| 5,355,522 A | * | 10/1994 | Demange | 455/62 |
| 5,719,885 A | * | 2/1998 | Ofer et al. | 714/6 |
| 5,734,815 A | | 3/1998 | Schatzberg | 714/6 |
| 6,061,822 A | * | 5/2000 | Meyer | 714/758 |
| 6,185,207 B1 | * | 2/2001 | LaBerge et al. | 370/392 |
| 6,304,992 B1 | | 10/2001 | Cypher | 714/757 |
| 6,516,386 B1 | | 2/2003 | Pang et al. | 711/118 |
| 6,519,733 B1 | * | 2/2003 | Har et al. | 714/758 |
| 6,539,503 B1 | | 3/2003 | Walker | 714/203 |
| 6,553,511 B1 | * | 4/2003 | DeKoning et al. | 714/6 |
| 6,629,288 B1 | * | 9/2003 | Bernath et al. | 714/807 |
| 2003/0093751 A1 | * | 5/2003 | Hohl | 714/781 |
| 2003/0115417 A1 | * | 6/2003 | Corrigan | 711/118 |

OTHER PUBLICATIONS

Damodaram et al., "Error Detection & Correction Options for Data Services in B–ISDN", © 1990 IEEE, p. 1751–1757.*

Glaise et al., "Fast CRC Calculation", © 1993 IEEE, p. 602–605.*

* cited by examiner

*Primary Examiner*—Donald Sparks
*Assistant Examiner*—Brian R. Peugh
(74) *Attorney, Agent, or Firm*—Lathrop & Gage, L.C.

(57) ABSTRACT

Methods and structure for loading a CRC value cache memory in a storage controller on the fly to reduce overhead processing associated with access to system memory to load the CRC value cache memory. The invention provides for circuits and methods for monitoring normal system accesses to system memory to manipulate CRC values in system memory in conjunction with associated access to disk drive of a storage subsystem. When accesses are detected loading or retrieving CRC values from system memory, the CRC values are loaded substantially in parallel into the CRC value cache memory.

18 Claims, 5 Drawing Sheets

METHODS AND APPARATUS FOR LOADING CRC VALUES INTO A CRC CACHE IN A STORAGE CONTROLLER

RELATED PATENTS

This patent is a continuation in part of, and claims priority under 35 U.S.C. §120 to, U.S. patent Ser. No. 10/022,051 filed on Dec. 17, 2001 and entitled Method and Apparatus for Protection of Data Utilizing CRC (hereinafter referred to as the "parent" patent application and hereby incorporated by reference). This patent is also related to co-pending, commonly owned U.S. patent application Ser. No. 10/057,863, filed Jan. 24, 2002 and entitled Methods and Apparatus for Managing Cached CRC Values in a Storage Controller which is hereby incorporated by reference (hereinafter referred to as the "sibling" patent).

BACKGROUND OF THE INVENTION

1. Field of the Invention

The present invention is directed generally toward a method and apparatus for protection of data utilizing cyclical redundancy checking (CRC) and more specifically relates to methods and structure for loading CRC values into a CRC value cache memory with minimal overhead.

2. Discussion of Related Art

In a high-performance computer system consisting of multiple processors and mass storage devices, it is of critical importance that all information be stored and retrieved reliably with no errors. It is of equal importance that if errors occur in the storage or retrieval of data, that the errors be detected and reported. Typically, the mass storage of a high-performance computer system consists of a redundant array of independent disks (RAID). Within the RAID mass storage system, data is stored both in semiconductor memory in the RAID controller and on the magnetic media of the RAID disk drives. A storage controller in such a RAID subsystem manages the transfer of information between semiconductor memory associated with the controller and the storage devices (i.e., disk drives). In a RAID subsystem, all data is stored with redundancy information to enhance reliability and to permit continued operation through various failures.

Though data written to semiconductor memory can be protected using error correction code (ECC) techniques, this will not prevent against inadvertent writes to locations in the memory or reading from incorrect locations. Furthermore, data stored on the disk drives of a RAID system can be stored incorrectly or retrieved incorrectly due to errors in the drives. For example, the drives or connections to the drives may have physical problems, data may be stored in the wrong location on the drive, or the data may become corrupted.

The method by which these errors are detected in the system should have minimum impact on the overall system performance. There are several approaches that may be used to protect data from the above-mentioned errors. One method involves the execution of software that checks the integrity of data as it is being stored or retrieved. This method, used to ensure the accuracy of transmitting digital data, is cyclical redundancy checking (CRC). This operation executes concurrently with the transfer of the data. Because this method utilizes a portion of the computing resources for its execution, the overall performance of the system is reduced. This method adds an additional amount of complexity to the software executing in the RAID system.

Another method involves a hardware engine that checks the integrity of data after it has been transferred. Though this method utilizes a small amount of computing resources to initialize and start the hardware engine, system performance is reduced due to the time required to initialize the engine and execute the checking algorithm. If a separate hardware engine is used to perform the CRC function after a transfer to or from system memory is completed, then the next system operation or transfer would have to wait until this CRC operation is completed before executing. This reduces system performance.

The parent patent application provides the addition of a dedicated hardware CRC computation engine integrated with the memory controller of the storage controller to assure the integrity of data transferred between the system memory and storage devices. The CRC computation engine provides CRC calculation "on-the-fly" for the protection of data transferred to and from the system memory without software overhead. The computation of CRC values and optional checking against previously calculated CRC values is selected through the use of an address-mapping scheme. The CRC protection scheme of the parent application requires a small amount of initial software overhead to allocate the data, CRC value, and CRC error regions of the system memory. After the CRC protection scheme is initialized, all CRC operations are transparent to the executing software.

The parent application further provides a separate cache memory for storing recently utilized CRC values. In the parent application, an exemplary preferred embodiment discloses multiple devices coupled through the memory interface each capable of generating transactions involving CRC values. A CRC engine generates CRC values as host supplied data is initially transferred to system memory of the storage controller. The generated CRC values are stored in system memory for later use. The parent application points to use of a cache for CRC values to expedite accesses to CRC values when used subsequently to check data transferred between the storage devices and the storage controller's system memory. Where all such CRC values are cached together, it remains a problem to rapidly locate a particular cached CRC value entry. Searching through a single hierarchy of the CRC value cache can negatively impact overall system performance. The sibling patent application presents methods and structure for improving system performance by reducing overhead in processing CRC values in CRC value cache memory. As other CRC values are generated, older values in cache may be replaced. It is often the case that later data exchanges to/from the storage devices and from/to the system buffer memory will have to re-read stored CRC values that are not present in the CRC cache memory.

It remains a problem that loading of CRC values into the CRC value cache memory for checking of blocks exchanged between system memory and the storage devices requires two accesses to the system memory. A first access moves the CRC values to or from system memory when the associated data block is accessed on the disk drives and a second access moves the CRC values from system memory to the CRC value cache memory when the associated data block is accessed in system memory. The extra memory access to load CRC values in CRC value cache memory negatively impacts overall system performance by adding extra arbitration overhead for access to system memory and by adding additional read cycles on the system memory to re-read the stored CRC values.

It is evident from the above discussion that a need exists for an improved method and structure for loading CRC values into a CRC value cache memory from system memory.

SUMMARY OF THE INVENTION

The present invention solves the above and other problems, thereby advancing the state of the useful arts, by providing structure and methods for reducing overhead processing when loading CRC values from system memory into a CRC value cache memory. More specifically the invention provides that CRC values are loaded into CRC cache memory in parallel with system memory access of CRC values relating to access to the storage devices. In other words, when CRC values are transferred to/from system memory from/to the disk drives of the storage system, structure and methods of the invention detect the transfers and load the CRC values into CRC value cache memory in parallel with the detected transfers. This mode of the present invention used to load CRC values into CRC cache memory is also referred to herein as "fly-by" mode. This fly-by feature of the invention reduces overhead processing associated with a need for a second access to system memory to load CRC values into CRC value cache memory.

Still more specifically, circuits of the present invention monitor the memory accesses by the processor of the storage controller to system memory in the controller. When CRC values are transferred from/to system memory in conjunction with associated disk drive transfers, the CRC values are captured by the CRC engine and stored in CRC value cache memory substantially in parallel with the transfers from/to system memory. These structures and methods of operation obviate the need for a second access to system memory specifically to load CRC values from system memory to the CRC value cache memory.

A first feature of the invention therefore provides a method in a system having a plurality of disk drives coupled to a storage controller having system memory and a CRC value cache memory, a method for loading CRC values into the cache memory comprising the steps of: monitoring access to the system memory by the storage controller; detecting normal mode accesses by the storage controller to CRC values in the system memory such that the normal mode accesses exchange the CRC values between the system memory and storage devices coupled to the storage controller; and loading the CRC values into the cache memory substantially in parallel with the detected normal mode access.

Another aspect of the invention further provides that the step of detecting includes the step of: determining that an address associated with the access is within a range of normal mode access addresses to determine that the access is a normal mode access.

Another aspect of the invention further provides that the step of determining comprises the step of: comparing the address against normal mode base and limit registers to determine that the access is within the range of normal mode access addresses.

Another aspect of the invention further provides that the step of determining comprises the steps of: comparing the address against generate mode base and limit registers to determine that the access is not within a range of generate mode access addresses; and comparing the address against check mode base and limit registers to determine that the access is not within a range of check mode access addresses.

Another aspect of the invention further provides that the step of detecting further includes the step of: determining that the address is within a range of CRC value access addresses to determine that the access is a normal mode access to CRC values in the system memory.

Another aspect of the invention further provides that the step of determining that the address is within a range of CRC value access addresses comprises the step of: comparing the address against CRC value base and limit registers to determine that the access is accessing CRC values in the system memory.

Another feature of the invention provides in a system having a plurality of disk drives coupled to a storage controller having system memory and a CRC value cache memory, an apparatus for loading CRC values into the cache memory comprising: means for monitoring access to the system memory by the storage controller; means for detecting normal mode accesses by the storage controller to CRC values in the system memory such that the normal mode accesses exchange the CRC values between the system memory and storage devices coupled to the storage controller; and means for loading the CRC values into the cache memory substantially in parallel with the detected normal mode access.

Another aspect of the invention further provides that the means for detecting includes: means for determining that an address associated with the access is within a range of normal mode access addresses to determine that the access is a normal mode access.

Another aspect of the invention further provides that the means for determining comprises: normal mode base and limit registers for defining the range; and means for comparing the address against the normal mode base and limit registers to determine that the access is within the range of normal mode access addresses.

Another aspect of the invention further provides the means for determining comprises: generate mode base and limit registers for defining a generate mode range of access addresses; check mode base and limit registers for defining a check mode range of access addresses; means for comparing the address against the generate mode base and limit registers to determine that the access is not within the generate mode range of access addresses; and comparing the address against the check mode base and limit registers to determine that the access is not within the check mode range of access addresses.

Another aspect of the invention further provides that the means for detecting further includes: means for determining that the address is within a range of CRC value access addresses to determine that the access is a normal mode access to CRC values in the system memory.

Another aspect of the invention further provides that the means for determining that the address is within a range of CRC value access addresses comprises: CRC value base and limit registers for defining a range of CRC value access addresses; and means for comparing the address against the CRC value base and limit registers to determine that the access is accessing CRC values in the system memory.

Another feature of the invention provides for a storage subsystem comprising: a plurality of storage devices for storing data blocks and CRC values corresponding to the data blocks; and a storage controller coupled to the plurality of storage devices for controlling operation of the storage subsystem such that the storage controller includes: system memory for storing the CRC values such that the storage controller exchanges the CRC values between the system memory and the plurality of storage devices using a normal mode memory transaction; a CRC value cache memory for storing the CRC values; and a fly-by transfer element coupled to the system memory and coupled to the CRC value cache memory for loading the CRC values into the CRC value cache memory substantially in parallel with the normal mode memory transaction.

Another aspect of the invention further provides that the storage controller further includes: a memory controller coupled to the system memory and providing an interface for other components of the storage controller to access the system memory, such that the fly-by transfer element is coupled to the system memory through the memory controller.

Another aspect of the invention further provides that the memory controller includes: a memory monitor bus adapted to enable the fly-by transfer element to detect the normal mode memory transaction.

Another aspect of the invention further provides that the memory controller further includes: a normal mode detector coupled to the memory monitor bus to detect the normal mode memory transaction and to apply a signal to the memory monitor bus indicating detection of the normal mode memory transaction.

Another aspect of the invention further provides that the normal mode detector comprises: normal mode base and limit registers for defining a range of normal mode access addresses; and a comparator for comparing an access address on the memory monitor bus against the normal mode base and limit registers to determine that the memory access is within the range of normal mode access addresses.

Another aspect of the invention further provides that the normal mode detector comprises: generate mode base and limit registers for defining a generate mode range of access addresses; check mode base and limit registers for defining a check mode range of access addresses; a comparator for comparing an access address on the memory monitor bus against the generate mode base and limit registers to determine that the access is not within the generate mode range of access addresses and for comparing the address against the check mode base and limit registers to determine that the access is not within the check mode range of access addresses.

DETAILED DESCRIPTION OF THE PREFERRED EMBODIMENTS

Figure 1:
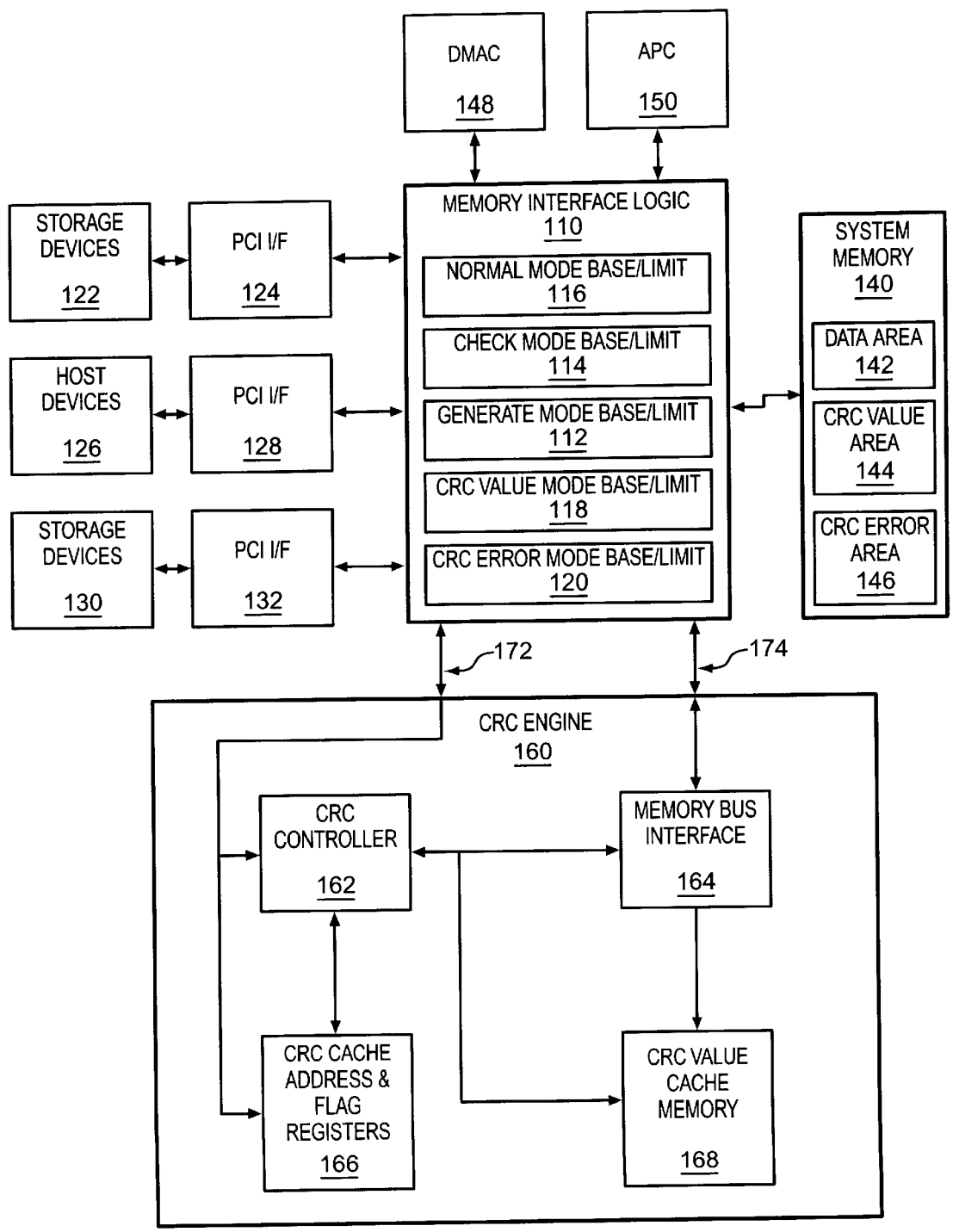
FIG. 1 is a block diagram illustrating a storage system in accordance with an exemplary preferred embodiment of the present invention.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

With reference now to the figures and in particular with reference to FIG. 1, a block diagram illustrating a storage system in accordance with a preferred embodiment of the present invention. Memory interface logic 110 manages the transfer of data from storage devices 122, 130 and host devices 126 via peripheral component interconnect (PCI) interfaces 124, 128, 132 to system memory 140 and from system memory to the storage devices and host devices. Transfers from devices into system memory are referred to herein as writes and transfers from memory to devices are referred to herein as reads. In like manner, memory interface 110 manages memory transactions between DMA controller 148 and system memory 140 and between array parity controller (APC) 150 and system memory 140.

For example, host devices 126 may write data to system memory 140 for subsequent storage in storage devices 122, 130. As another example, data may be written from one of storage devices 122, 130 to system memory 140 and read from system memory 140 to be transferred to one of host devices 126. Direct memory access (DMA) controller 148 also transfers blocks of data from memory to storage devices. Furthermore, array parity control 150 takes data in blocks of memory, performs calculations, and creates new data. The array parity control is used in striping data across storage devices.

In accordance with a preferred embodiment of the present invention, CRC engine 160 is provided to assure the integrity of data transferred between the system memory and storage devices accessed through PCI buses. The CRC engine provides CRC calculation on the fly for protection of data transferred to or from the system memory without software overhead.

The computation of CRC values and optional checking against previously calculated CRC values is selected through the use of a unique PCI address-mapping scheme. The system memory is preferably accessed in one of three modes: normal, generate, and check. The generate mode is generally used when data blocks are first transferred from the host system to the system memory of the controller. In a CRC generate mode access, the PCI address of a memory transfer for a data block falls within the range of the CRC Generate base and limit registers 112. For this transfer, a CRC value is calculated and written to CRC value area 144 of system memory by the CRC engine. The CRC values so generated and written to system memory are used later to check exchanges of data blocks between system memory and the storage devices.

The CRC check mode of access is generally used when data blocks are to be exchanged between system memory and the storage devices. In a CRC check mode access, the PCI address of a memory transfer for a data block falls within the range of the CRC check base and limit registers 114. For this transfer, a CRC value is calculated and compared against a previously generated CRC value in the CRC value area of the system memory. If the computed value for the data transfer does not compare against the previously computed value, an error in the data is detected. A transfer of error information to CRC error area 146 of system memory by the CRC engine reports the error. In a normal mode access, the PCI address of a memory transfer does not fall within either the CRC generate or CRC check regions.

The CRC check mode of access may also be utilized in read requests by a host system to retrieve requested data from system memory of the storage controller. This mode of access preferably uses the CRC check mode to further assure data integrity. However, this use of CRC check mode is generally not of interest with respect to the present invention's use of CRC check mode access for fly-by loading of CRC value cache memory.

A data block is transferred from a host system to system memory of the storage controller using the generate mode of access (i.e., using a generate mode memory map as discussed further below). A data block is transferred from disk to system memory or from system memory of the storage controller to disks using the check mode of access (i.e., using a check mode memory map as discussed further below). In both cases the associated CRC values are transferred to or from system memory using a normal mode memory map so as to not engage the computations of the CRC engine. A normal mode access is preferably indicated when the address does not fall within either the check base and limit registers 114 or the generate base and limit registers 112. Normal mode base and limit registers 116 are shown in FIG. 1 suggesting that in an alternative embodiment, a base and limit register may be set to detect a normal mode transfer as distinct from detecting the normal mode transfer as a failure to match either of the check and generate base and limit registers (114 and 112, respectively).

CRC engine 160 interfaces to memory interface logic 110 via memory monitor bus 172 and CRC memory read/write bus 174. The memory monitor bus provides a status of the current system memory activity to the CRC engine. The starting address, active port identification (ID), data direction, and data for each transaction to or from the system memory is preferably output from the memory interface logic on the memory monitor bus. Additionally, the port indicates to the CRC engine whether the data transfer falls within the CRC generate region or the CRC check region (or within the normal region defined by the normal base and limit registers). The CRC memory read/write bus is used by the CRC engine to read previously computed CRC values from system memory when checking a CRC value and to write newly computed CRC values to system memory when generating a CRC value. CRC memory read/write bus 174 is also used to write CRC error information to system memory.

When a generate memory transfer begins, CRC controller 162 begins calculation of the CRC value. The CRC controller may use, for example, the CRC-32 polynomial to calculate the remainder. As each 128-bit memory word is presented at the memory monitor bus, the calculation is updated. A CRC remainder is calculated on a block-by-block basis. When the transfer is completed, the CRC engine writes the calculated CRC values to the system memory via memory bus interface 164.

When a check memory transfer begins, CRC controller 162 reads previously generated CRC values from system memory 140 for the data block being transferred via memory bus interface 164. If CRC cache address and flag registers 166 detect that CRC values are already cached, appropriate flags are presented to CRC controller 162 and the values are read from CRC value cache 168 rather than system memory. The CRC remainder calculation then begins with the first word presented at the memory monitor bus and continues until the end of a block is reached. The computed value is compared with the previously computed value to determine if an error is present. If the CRC controller detects an error, the appropriate error information for the block is written to CRC error area 146 of system memory via memory bus interface 164. The CRC controller may also inform the memory interface logic of the error by, for example, setting an interrupt, generating PCI system errors (PCI SERR), setting status bits, etc.

The CRC values are read using the normal mode access to system memory as discussed further herein below. Normal mode operations involve exchanges of CRC values (associated with corresponding data blocks) between system memory 140 and disk drives 122 and 130. These normal mode operations generally are performed as a first step in a check mode operation transferring data between system memory and the storage devices. A check mode operation first transfers all appropriate CRC values between system memory and the storage devices. This transfer is performed in a normal mode of operation (i.e., without engaging the CRC engine computations through by using addresses outside the check and generate base and limit registers). A second transfer is then performed to move the relevant data blocks between the system memory and the storage devices. This second transfer uses the check mode of access (i.e., addresses within the check mode base and limit register defined range). The check mode access then triggers operation of the CRC engine to verify the data transfer against the expected CRC values.

Figure 2:
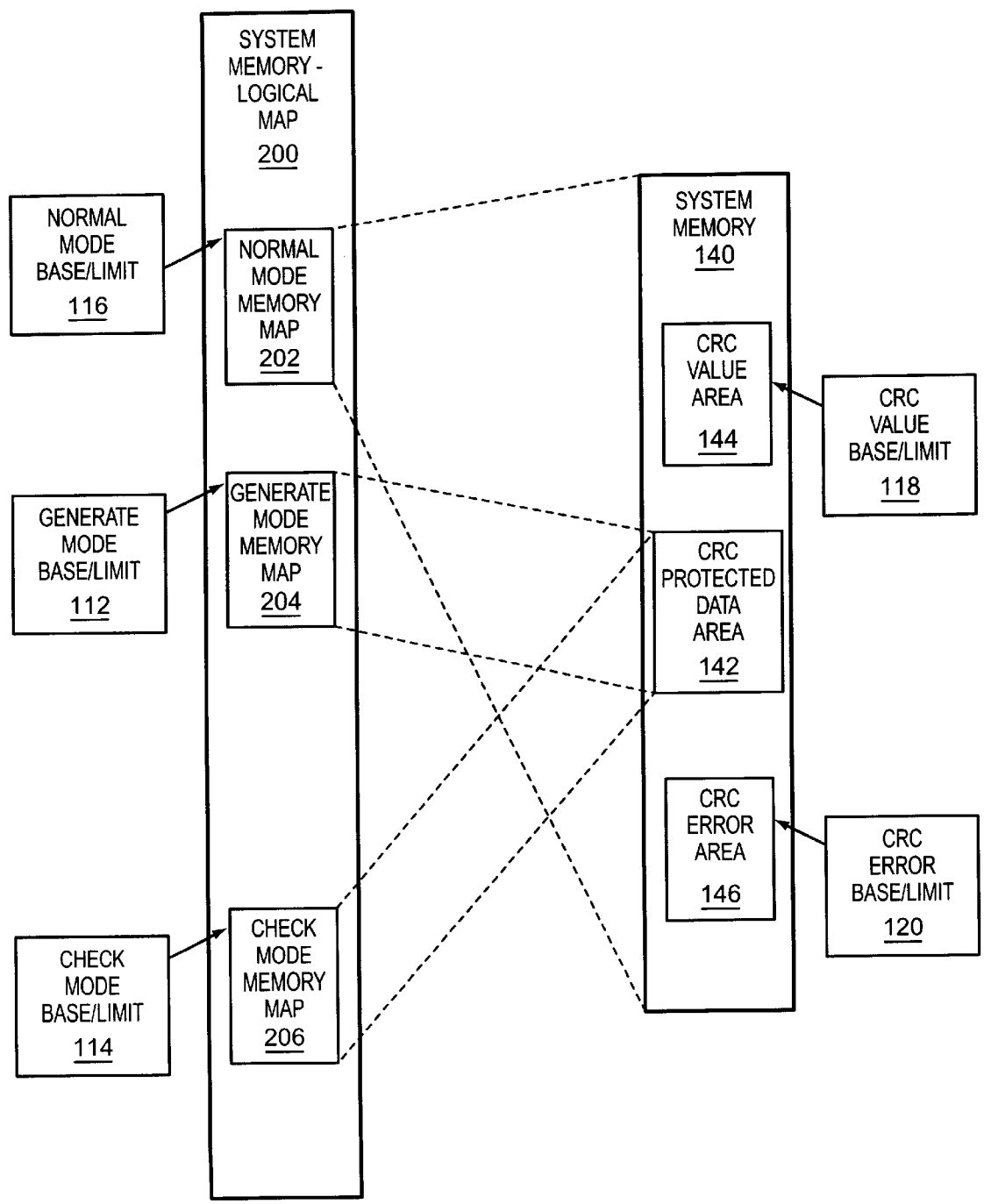
FIG. 2 is a diagram of an exemplary mapping of system memory in accordance with the present invention.

FIG. 2 is a block diagram depicting an exemplary preferred logical mapping 200 of system memory 140 for use in normal mode, generate mode and check mode transaction in system memory. The check and generate modes of access to system memory 140 preferably each use a different range of logical addresses. Each range of logical addresses maps to the same area of system memory 140, specifically, each maps to the data area 142 of system memory 140. The normal mode of operation, generally used to access the CRC values, preferably maps to all of the physical system memory making all values accessible in a manner that does not engage the CRC engine to generate or check CRC values.

The logical address for each range is defined by the corresponding base and limit register set. As above, check mode base and limit registers 114 determine a logical address range for the check mode logical memory map 206. Generate mode base and limit registers 112 preferably determine a logical address range for the generate mode logical address map 204. Normal mode address map 202 is a range of logical addresses that preferably fall outside of both the generate mode map 204 and the check mode map 206. As noted above, in an alternate embodiment, a separate normal mode base and limit register set 116 may be used to specifically define the normal mode addresses. Using this structure, the CRC engine may detect whether an access to system memory is in accordance with normal mode, check mode or generate mode.

An additional base and limit register (118) preferably defines the range of physical addresses in system memory where CRC values are stored (CRC value area 144). Use of these registers permits the CRC engine to determine whether a normal mode access is directed to CRC values (144) or other areas of system memory (i.e., data area 142 or CRC error area 146).

During normal mode transactions in system memory CRC values are accessed in the CRC value area 144 of system memory 140 (through use of the normal mode memory map 202). As noted, these accesses are typically used by the storage controller when moving CRC values to or from the storage devices in response to I/O requests directed to the storage controller from external host devices.

As discussed in the sibling application, operation of the storage controller is improved by organizing the CRC value cache memory to reduce overhead in locating cached CRC values. The sibling application presented a mapping structure for determining a cache set and offset in that cache set corresponding to a data block and a sub-block within that block, respectively. The present invention uses a similar structure to rapidly identify a cache set where CRC values in system memory should be loaded into CRC value cache memory.

Figure 3:
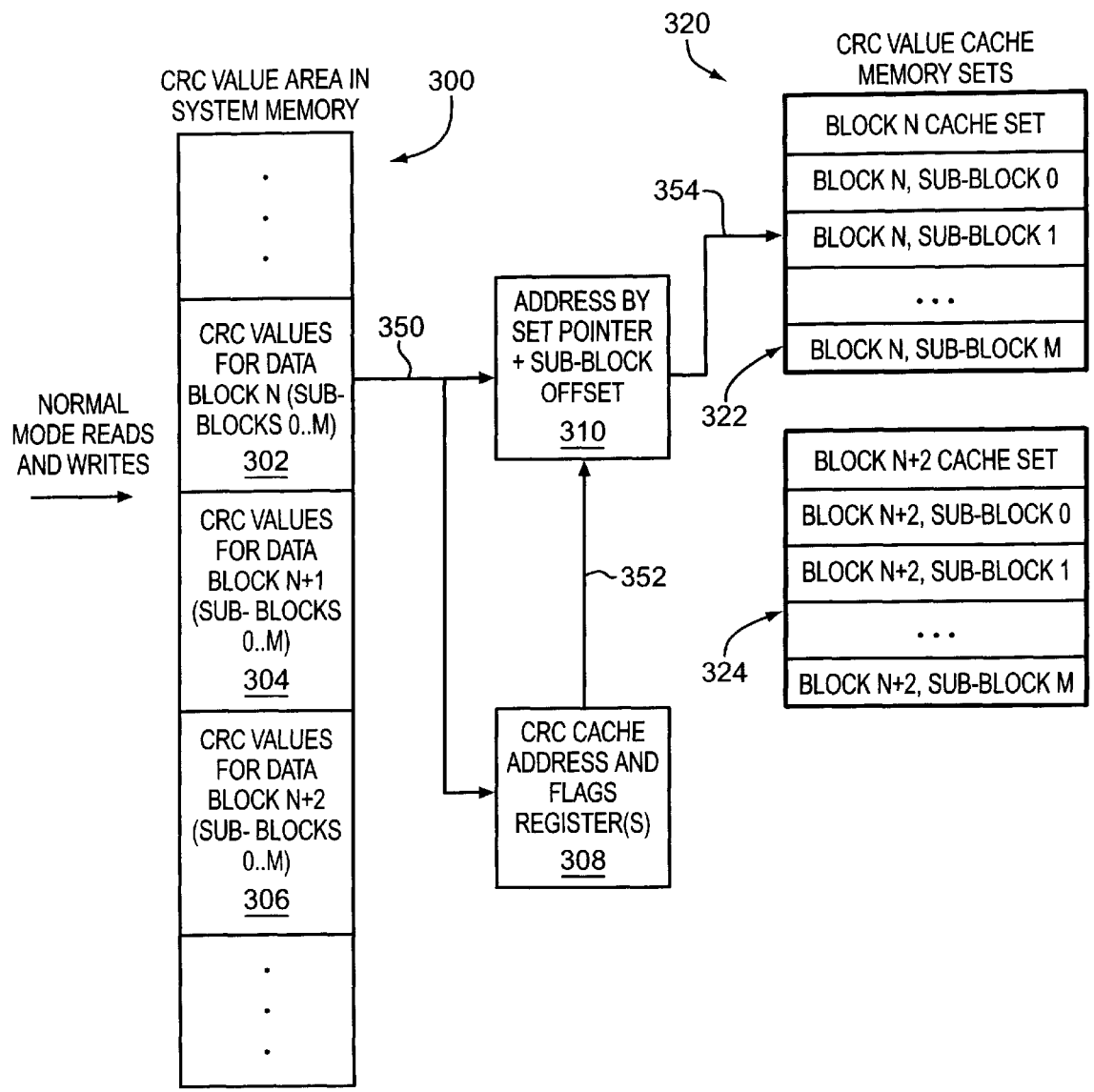
FIG. 3 is a block diagram illustrating a mapping from a CRC value storage area in system memory to CRC sets in a CRC value cache memory in accordance with a preferred embodiment of the present invention.

FIG. 3 is a block diagram depicting an exemplary preferred overall organization of CRC values in system memory 300 and associated cache sets 322 and 324 in CRC value cache memory 320. In particular, system memory 300 includes storage allocated to the plurality of CRC values 302 through 306 corresponding to associated data blocks. Each CRC value 302 through 306 includes individual CRC values for of a plurality of sub-blocks identified by index number 0 through M within the corresponding block. The CRC engine (element 160 of FIG. 1) includes logic circuits for identifying addresses of CRC values accessed in system memory by monitoring CRC transactions addressed to system memory. When a CRC value is requested in a normal mode transaction in system memory (indicated as path 350), element 310 is operable to generate an appropriate location in CRC value cache memory 320 in which the accessed CRC value should be stored. In particular, element 310 combines a pointer to the cache set (322 or 324) starting address with an offset for the desired sub-block of the data block related to the accessed CRC values. The cache set and sub-block offset are derived directly from monitored system memory address signals on path 350. Those of ordinary skill in the art will readily recognize the simple computations required to translate a detected system memory address on path 350 into a corresponding CRC cache set and subblock offset within that set. Other known cache management techniques will be readily apparent to those skilled in the art such that the CRC value may be stored by generation of a unique address or other index into the cache table. In the exemplary preferred embodiment, a detected normal mode system memory address is directly translated to an associated CRC cache set and an offset within that set corresponding to the accessed CRC value. FIG. 3 is intended merely to suggest one possible implementation to provide rapid translation of the detected normal mode address for an accessed CRC value into a corresponding location in CRC value cache memory.

As noted above, a typical check mode transaction entails first accessing the CRC values relevant to the data blocks to be transferred and then transferring the data blocks. In other words, transferring all CRC values that might be in a CRC cache set corresponding to an addressed block. This transfer is performed in normal mode so as to not engage the CRC engine computations. Second, the required data blocks are transferred in check mode to engage the CRC engine to verify the proper data transfer by confirming the CRC value associated with the data block transfer.

Figure 4:
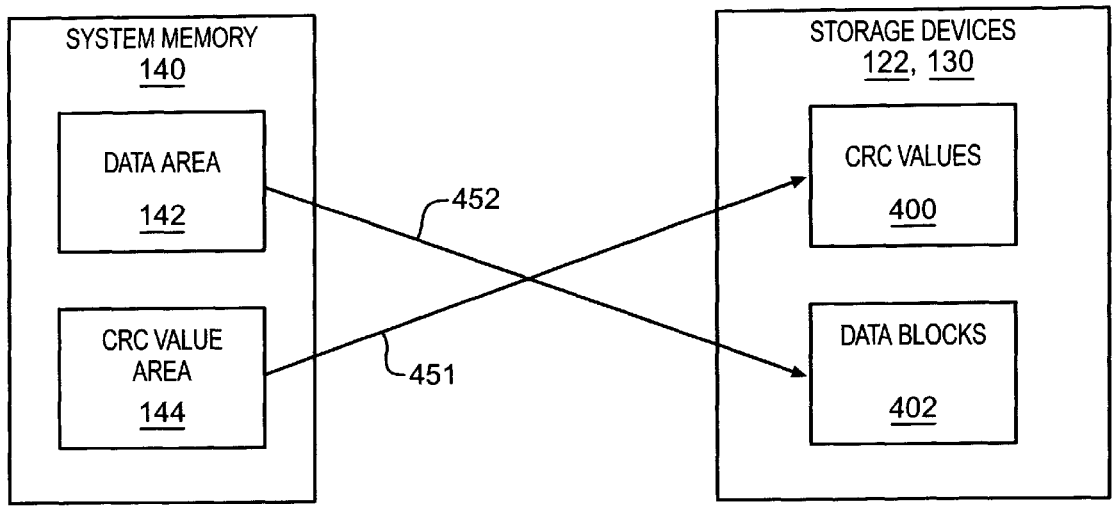
FIG. 4 is a block diagram of typical transfers from and to system memory in conjunction with storage devices whereby fly-by methods and structure of the present invention load CRC values.
Figure 4:
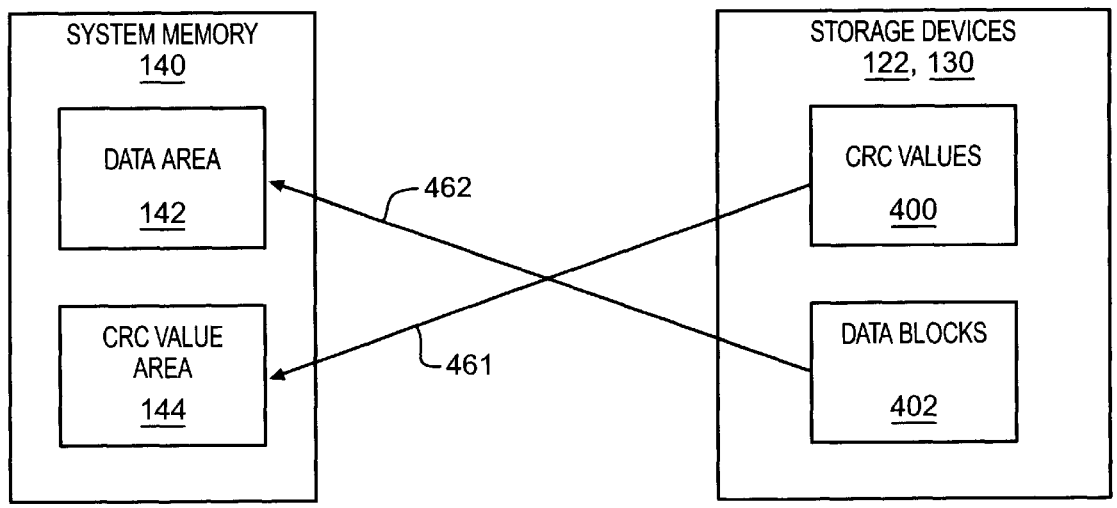

FIG. 4 is a block diagram representing two such transactions. The top of FIG. 4 represents a read check transaction in which CRC values and data blocks are transferred from system memory to the storage devices. The lower portion of the figure represents a write check transaction in which CRC values and corresponding data blocks are transferred from storage devices to the system memory. In a read check operation, CRC values are first retrieved from system memory using a normal mode memory map as indicated by arrow 451 and stored in a corresponding CRC value area 400 on storage devices 122 and/or 130. The corresponding data blocks are next transferred as indicated by arrow 452 from the data area 142 of system memory 140 to the data storage area 402 of storage devices 122 and/or 130. This transfer is performed using a check mode memory map to enable the CRC engine to verify the data transfers using the CRC values. It is the first transfer of CRC values that is detected by the CRC engine in accordance with the present invention to enable "fly-by" loading of the accessed CRC values into the CRC value cache memory.

In like manner, the write check operation depicted in FIG. 4 shows the CRC values 400 (arrow 461) transferred from the storage devices 122 and/or 130 to the CRC value area 144 in system memory 140 using a normal mode memory map. Next, the corresponding data blocks 402 are transferred (arrow 462) from the storage devices 122 and/or 130 to the data area 142 of system memory 140 using a check mode memory map. As above, the first transfer of the CRC values is monitored by the CRC engine to permit "fly-by" loading of the CRC values into the CRC value cache memory.

Figure 5:
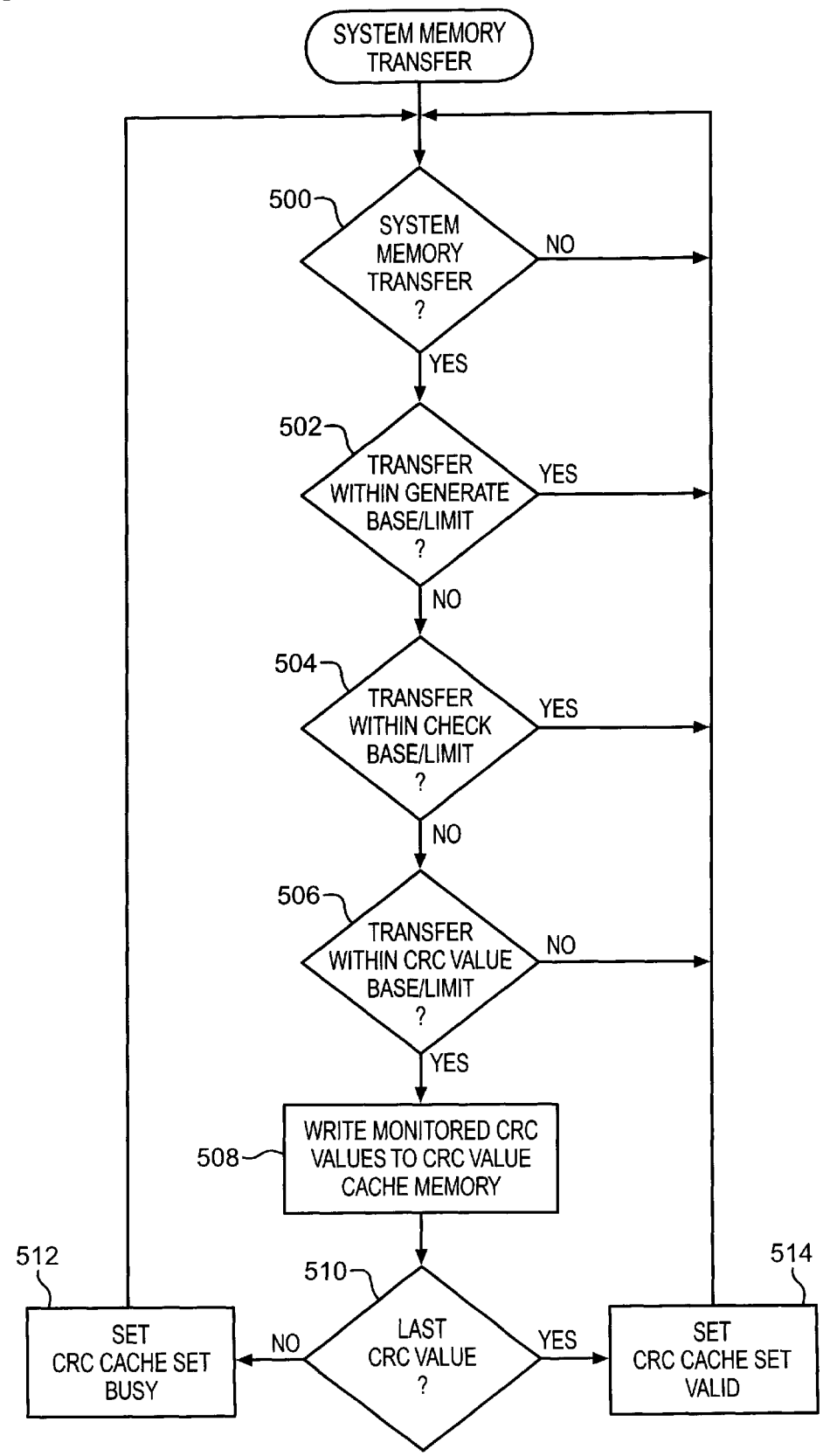
FIG. 5 is a flowchart describing a method of the present invention to detect system memory transactions whereby CRC value cache memory may be loaded in a fly-by manner.

FIG. 5 is a flowchart describing a method of the present invention to perform fly-by loading of CRC values into CRC value cache memory in response to detecting normal mode accesses to the CRC values in system memory. Element 500 is first operable to determine whether the sensed occurrence of a transaction on the memory interface bus represents a system memory transaction. When such a transaction is detected, element 502 then determines whether the sensed transaction is a generate mode transaction that need not use the fly-by mode. As above, a system memory transaction is preferably deemed to be a generate mode transaction if the logical address sensed on the memory monitor bus is within the range defined by the generate mode base and limit registers. If so, processing loops back to element 500 to await a next system memory transaction. Element 504 next determines whether the sensed transaction was a check mode transaction. Again as above, a transaction is deemed a check mode transaction if the logical address is within the range defined by the check mode base and limit registers. If so, processing loops back to element 500 to await a next system memory transaction.

If the sensed system memory transaction is neither a generate mode access nor a check mode access, it is preferably presumed to be a normal mode access. Element 506 then determines whether the normal mode transaction is accessing CRC values or data blocks in system memory by comparing the logical address to the base and limit registers defining the CRC value address range in system memory. If the transaction is not directed to CRC values, processing continues by looping back to element 500 to await a next transaction involving system memory.

If a normal mode transaction is sensed accessing the CRC values stored in system memory, element 508 is operable to load the accessed CRC values into CRC value cache memory in a fly-by manner as they are transferred between the storage device and system memory. This fly-by mode loading of CRC values into the CRC value cache memory obviates the need for a second read of CRC values from system memory to load the CRC values cache memory. Eliminating the need for a second reading of system memory improves overall system performance by reducing arbitration for the second access to system memory and by eliminating the extra read cycles issued to system memory to re-read the CRC values for transfer into CRC value cache memory.

Element 510 then determines whether all CRC values corresponding to the system memory normal mode access detected (i.e., the entire cache set corresponding to a block) have been copied to the CRC cache. If not, element 512 marks the cache set of the corresponding block as busy (presently being loaded) and thus not yet available for use of the cached values. Otherwise, element 514 clears the busy indicator to permit use of the cached CRC values. In either case, processing loops back to element 500 to await a next detected transaction involving system memory. Those skilled in the art will recognize modifications to the structures and methods of the invention to comply with the setting and clearing of the busy indicator. In the preferred embodiment, all CRC values corresponding to a data block are transferred in a single, continuous sequence of normal mode memory transactions. Only where the sequence of transfers may be interrupted by other activity that may attempt to access the cached CRC values does the need arise to use a busy indicator to protect against. Such design choices are well-known to those of ordinary skill in the art.

As noted above, in an alternate embodiment, a normal mode register set may be used to actively assert that the memory access is a normal mode access. The preferred embodiment provides for a check mode base and limit register set and a generate mode base and limit register set for other purposes as presented in the parent patent. The preferred embodiment therefore uses these existing registers to detect a normal mode access rather than requiring an additional base and limit register set to detect a normal mode access to system memory. Alternate equivalent methods to detect a normal mode transaction wherein fly-by monitoring may be used to load CRC values to cache will be readily apparent to those of ordinary skill in the art.

While the invention has been illustrated and described in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. In a system having a plurality of disk drives coupled to a storage controller having system memory and a CRC value cache memory, a method for loading CRC values into said cache memory comprising the steps of:
    monitoring access to said system memory by said storage controller;
    detecting normal mode accesses by said storage controller to CRC values in said system memory wherein said normal mode accesses exchange said CRC values between said system memory and storage devices coupled to said storage controller; and
    loading said CRC values into said cache memory substantially in parallel with the detected normal mode nee accesses.

2. The method of claim 1 wherein the step of detecting includes the step of
    determining that an address associated with said access to said system memory is within a range of normal mode access addresses to determine that said access to said system memory is a normal mode access.

3. The method of claim 2 wherein the step of determining comprises the step of:
    comparing said address against normal mode base and limit registers to determine that said access to said system memory is within said range of normal mode access addresses.

4. The method of claim 2 wherein the step of determining comprises the steps of:
    comparing said address against generate mode base and limit registers to determine that said access to said system memory is not within a range of generate mode access addresses; and
    comparing said address against check mode base and limit registers to determine that said access to said system memory is not within a range of check mode access addresses.

5. The method of claim 2 wherein the step of detecting further includes the step of:
    determining that said address is within a range of CRC value access addresses to determine that said access to said system memory is a normal mode access to CRC values in said system memory.

6. The method of claim 5 wherein the step of determining that said address is within a range of CRC value access addresses comprises the step of:
    comparing said address against CRC value base and limit registers to determine that said access to said system memory is accessing CRC values in said system memory.

7. In a system having a plurality of disk drives coupled to a storage controller having system memory and a CRC value cache memory, an apparatus for loading CRC values into said cache memory comprising:
    means for monitoring access to said system memory by said storage controller;
    means for detecting normal mode accesses by said storage controller to CRC values in said system memory wherein said normal mode accesses exchange said CRC values between said system memory and storage devices coupled to said storage controller; and
    means for loading said CRC values into said cache memory substantially in parallel with the detected normal mode accesses.

8. The apparatus of claim 7 wherein the means for detecting includes:
    means for determining that an address associated with said access is within a range of normal mode access addresses to determine that said access to said system memory is a normal mode access.

9. The apparatus of claim 8 wherein the means for determining comprises:
    normal mode base and limit registers for defining said range; and
    means for comparing said address against said normal mode base and limit registers to determine that said access to said system memory is within said range of normal mode access addresses.

10. The apparatus of claim 8 wherein the means for determining comprises:
    generate mode base and limit registers for defining a generate mode range of access addresses;
    check mode base and limit registers for defining a check mode range of access addresses;
    means for comparing said address against said generate mode base and limit registers to determine that said access to said system memory is not within said generate mode range of access addresses; and
    comparing said address against said check mode base and limit registers to determine that said access to said system memory is not within said check mode range of access addresses.

11. The apparatus of claim 8 wherein the means for detecting further includes:
    means for determining that said address is within a range of CRC value access addresses to determine that said access to said system memory is a normal mode access to CRC values in said system memory.

12. The apparatus of claim 11 wherein the means for determining that said address is within a range of CRC value access addresses comprises:

CRC value base and limit registers for defining a range of CRC valve access addresses; and means for comparing said address against said CRC value base and limit registers to determine that said access to said system memory is accessing CRC values in said system memory.

13. A storage subsystem comprising:

a plurality of storage devices for storing data blacks and CRC values corresponding to said data blocks; and a storage controller coupled to said plurality of storage devices for controlling operation of said storage subsystem wherein said storage controller includes:

system memory for storing said CRC values wherein said storage controller exchanges said CRC values between said system memory and said plurality of storage devices using a normal mode memory transaction;

a CRC value cache memory for storing said CRC values; and a fly-by transfer element coupled to said system memory and coupled to said CRC value cache memory for loading said CRC values into said CRC value cache memory substantially in parallel with said normal mode memory transaction.

14. The subsystem of claim 13 wherein said storage controller further includes:

a memory controller coupled to said system memory and providing an interface for other components of said storage controller to access said system memory, wherein said fly-by transfer element is coupled to said system memory through said memory controller.

15. The subsystem of claim 14 wherein said memory controller includes:

a memory monitor bus adapted to enable said fly-by transfer element to detect said normal mode memory transaction.

16. The subsystem of claim 15 wherein said memory controller further includes:

a normal mode detector coupled to said memory monitor bus to detect said normal mode memory transaction and to apply a signal to said memory monitor bus indicating detection of said normal mode memory transaction.

17. The subsystem of claim 16 wherein said normal mode detector comprises;

normal mode base and limit registers for defining a range of normal mode access addresses; and a comparator for comparing an access address on said memory monitor bus against said normal mode base and limit registers to determine an access to system memory is within said range of normal mode access addresses.

18. The subsystem of claim 16 wherein said normal mode detector comprises:

generate mode base and limit registers for defining a generate mode range of access addresses;

check mode base and limit registers for defining a check mode range of access addresses;

a comparator for comparing an access address on said memory monitor bus against said generate mode base and limit registers to determine that said an access to system memory is not within said generate mode range of access addresses and for comparing said address against said check mode base and limit registers to determine that said access to system memory is not within said check mode range of access addresses.

* * * * *